US008554348B2

(12) United States Patent
Gehring et al.

(10) Patent No.: US 8,554,348 B2
(45) Date of Patent: Oct. 8, 2013

(54) TRANSIENT DETECTION USING A DIGITAL AUDIO WORKSTATION

(75) Inventors: Steffen Gehring, Hamburg (DE); Thorsten Adam, Hamburg (DE)

(73) Assignee: Apple Inc., Cupertino, CA (US)

( * ) Notice: Subject to any disclaimer, the term of this patent is extended or adjusted under 35 U.S.C. 154(b) by 901 days.

(21) Appl. No.: 12/505,915

(22) Filed: Jul. 20, 2009

(65) Prior Publication Data

US 2011/0015766 A1 Jan. 20, 2011

(51) Int. Cl.
*G06F 17/00* (2006.01)

(52) U.S. Cl.
USPC .......................................................... 700/94

(58) Field of Classification Search
USPC .......................................................... 700/94
See application file for complete search history.

(56) References Cited

U.S. PATENT DOCUMENTS

| | | | | |
|---|---|---|---|---|
| 4,683,589 | A | 7/1987 | Scholz et al. | |
| 6,766,300 | B1 | 7/2004 | Laroche | |
| 7,315,244 | B2 | 1/2008 | Carmichel | |
| 8,093,484 | B2 * | 1/2012 | Walker et al. | 84/603 |
| 8,144,881 | B2 * | 3/2012 | Crockett et al. | 381/56 |
| 2003/0205124 | A1 * | 11/2003 | Foote et al. | 84/608 |
| 2004/0122662 | A1 * | 6/2004 | Crockett | 704/200.1 |
| 2004/0133423 | A1 * | 7/2004 | Crockett | 704/229 |
| 2004/0181403 | A1 * | 9/2004 | Hsu | 704/230 |
| 2006/0156159 | A1 * | 7/2006 | Harada | 714/746 |
| 2006/0200344 | A1 * | 9/2006 | Kosek et al. | 704/226 |
| 2008/0148924 | A1 * | 6/2008 | Tsui et al. | 84/618 |
| 2010/0057453 | A1 * | 3/2010 | Valsan | 704/232 |

OTHER PUBLICATIONS

ReCycle users manual: Copyright 2003.*

* cited by examiner

*Primary Examiner* — Paul McCord
(74) *Attorney, Agent, or Firm* — Kilpatrick Townsend & Stockton LLP

(57) ABSTRACT

A processor implements methods, systems, and computer program products for detecting transients in an audio file. The method includes dividing the audio file into segments. Transients can be detected both in a full band signal of the audio file and one or more band-pass filtered signals of the audio file. A weight value can be assigned to each transient detected in both the full band signal and band-pass filtered signals. Transients that are below a predetermined threshold value can be eliminated. The time position of each remaining transient is determined and displayed in the audio file.

39 Claims, 9 Drawing Sheets

600

405

400

600

700

TRANSIENT DETECTION USING A DIGITAL AUDIO WORKSTATION

FIELD

The following relates to computing devices capable of and methods for arranging music, and more particularly to algorithms for detecting transients using a digital audio workstation.

BACKGROUND

Artists can use software to create musical arrangements. This software can be implemented on a computer to allow an artist to write, record, edit, and mix musical arrangements. Typically, such software can allow the artist to arrange files on musical tracks in a musical arrangement. A computer that includes the software can be referred to as a digital audio workstation (DAW). The DAW can display a graphical user interface (GUI) to allow a user to manipulate files on tracks. The DAW can display each element of a musical arrangement, such as a guitar, microphone, or drums, on separate tracks. For example, a user may create a musical arrangement with a guitar on a first track, a piano on a second track, and vocals on a third track. The DAW can further break down an instrument into multiple tracks. For example, a drum kit can be broken into multiple tracks with the snare, kick drum, and hi-hat each having its own track. By placing each element on a separate track a user can able to manipulate a single track, without affecting the other tracks. For example, a user can adjust the volume or pan of the guitar track, without affecting the piano track or vocal track. As will be appreciated by those of ordinary skill in the art, using the GUI, a user can apply different effects to a track within a musical arrangement. For example, volume, pan, compression, distortion, equalization, delay, and reverb can some of the effects that can be applied to a track.

Typically, a DAW works with two main types of files: MIDI (Musical Instrument Digital Interface) files and audio files. MIDI can an industry-standard protocol that enables electronic musical instruments, such as keyboard controllers, computers, and other electronic equipment, to communicate, control, and synchronize with each other. MIDI does not transmit an audio signal or media, but rather transmits "event messages" such as the pitch and intensity of musical notes to play, control signals for parameters such as volume, vibrato and panning, cues, and clock signals to set the tempo. As an electronic protocol, MIDI is notable for its widespread adoption throughout the industry.

Using a MIDI controller coupled to a computer, a user can record MIDI data into a MIDI track. Using the DAW, the user can select a MIDI instrument that can be internal to a computer and/or an external MIDI instrument to generate sounds corresponding to the MIDI data of a MIDI track. The selected MIDI instrument can receive the MIDI data from the MIDI track and generate sounds corresponding to the MIDI data which can be produced by one or more monitors or speakers. For example, a user may select a piano software instrument on the computer to generate piano sounds and/or may select a tenor saxophone instrument on an external MIDI device to generate saxophone sounds corresponding to the MIDI data. If MIDI data from a track is sent to an internal software instrument, this track can be referred to as an internal track. If MIDI data from a track is sent to an external software instrument, this track can be referred to as an external track.

Audio files can be recorded sounds. An audio file can be created by recording sound directly into the system. For example, a user may use a guitar to record directly onto a guitar track or record vocals, using a microphone, directly onto a vocal track. As will be appreciated by those of ordinary skill in the art, audio files can be imported into a musical arrangement. For example, many companies professionally produce audio files for incorporation into musical arrangements. In another example, audio files can be downloaded from the Internet. Audio files can include guitar riffs, drum loops, and any other recorded sounds. Audio files can be in sound digital file formats such as WAV, MP3, M4A, and AIFF. Audio files can also be recorded from analog sources, including, but not limited to, tapes and records.

Manipulation of audio files often requires detecting transients. A transient is a short-duration signal that represents a non-harmonic attack phase of a musical sound or vocals. A transient contains a high degree of non-periodic components and a higher magnitude of high frequencies than the harmonic content of that sound. A common method of detecting transient events is to subtract the envelope amplitude of the audio signal from the Root Mean Squared (RMS) value at the time of the signal. Differences can be an indication for a transient event. However, this method has disadvantages in that the initial calculation of RMS and RMS in silent passages can lead to a significant number of false detections. Those of ordinary skill in the art would recognize that other conventional methods for detecting transients can lead to a significant number of false detections.

SUMMARY

As introduced above, users may desire to detect and adjust transients of audio tracks in a digital audio workstation. Therefore, processor implemented methods, systems, and computer-readable media for detecting transients in an audio file are disclosed. The method includes dividing the audio file into segments. Transients can be detected both in a full band signal of the audio file and one or more band-pass filtered signals of the audio file. A weight value is assigned to each transient detected in both the full band signal and band-pass filtered signals. Transients that are below a predetermined threshold value can be eliminated. The time position of each remaining transient is determined and displayed in the audio file.

Many other aspects and examples will become apparent from the following disclosure.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION

The functions described as being performed at various components can be performed at other components, and the various components can be combined and/or separated. Other modifications also can be made.

Thus, the following disclosure ultimately will describe systems, computer readable media, devices, and methods for detecting transients. Many other examples and other characteristics will become apparent from the following description.

Figure 1:
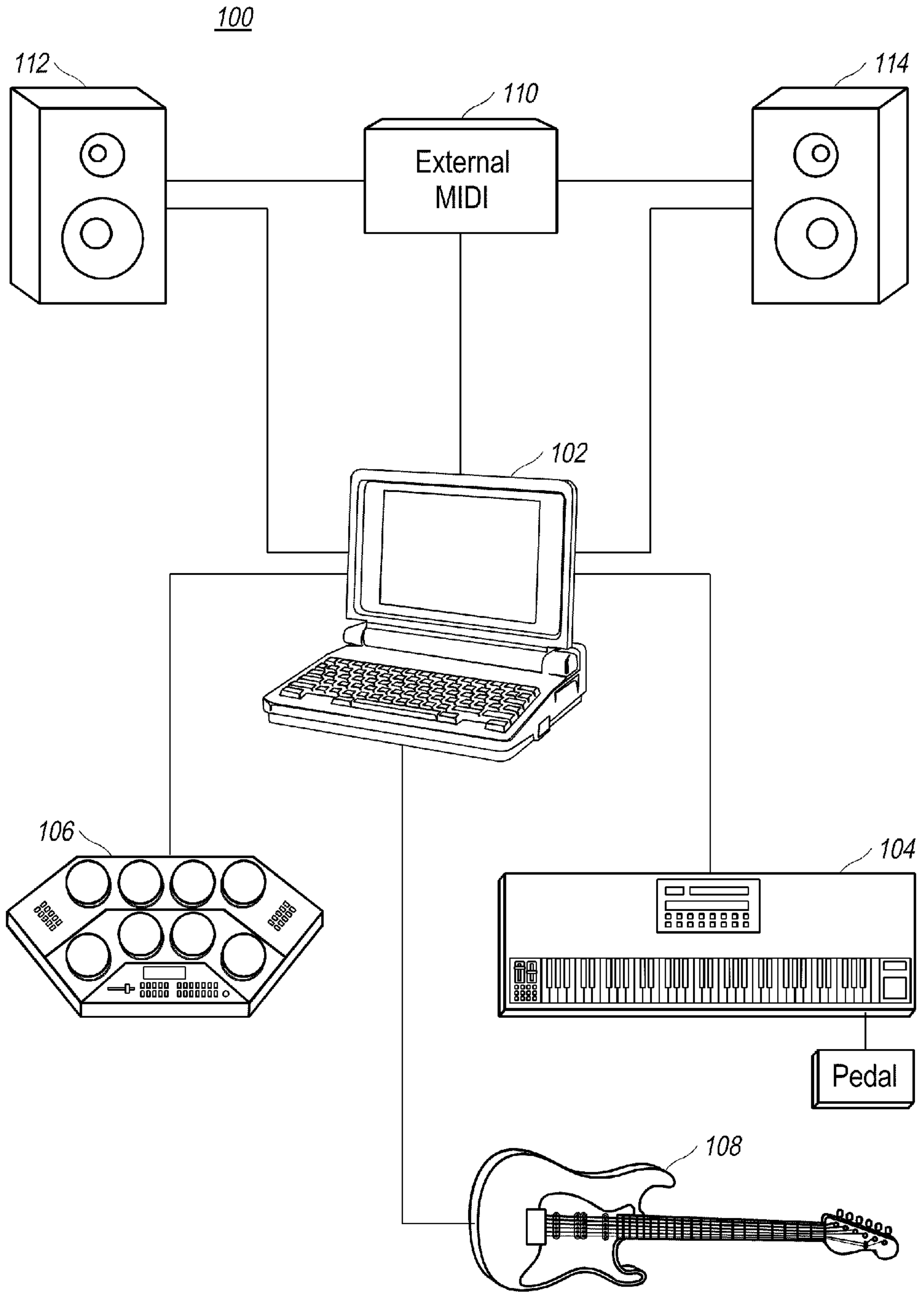
FIG. 1 depicts a block diagram of a system having a DAW musical arrangement in accordance with an exemplary embodiment.

Referring to FIG. 1, a block diagram of a system including a DAW in accordance with an exemplary embodiment is illustrated. As shown, the system 100 can include a computer 102, one or more sound output devices 112, 114, one or more MIDI controllers (e.g. a MIDI keyboard 104 and/or a drum pad MIDI controller 106), one or more instruments (e.g. a guitar 108, and/or a microphone (not shown)), and/or one or more external MIDI devices 110. As would be appreciated by one of ordinary skill in the art, the musical arrangement can include more or less equipment as well as different musical instruments.

The computer 102 can be a data processing system suitable for storing and/or executing program code, e.g., the software to operate the GUI which together can be referred to as a, DAW. The computer 102 can include at least one processor, e.g., a processor, coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters. In one or more embodiments, the computer 102 can be a desktop computer or a laptop computer.

A MIDI controller can be a device capable of generating and sending MIDI data. The MIDI controller can be coupled to and send MIDI data to the computer 102. The MIDI controller can also include various controls, such as slides and knobs, that can be assigned to various functions within the DAW. For example, a knob may be assigned to control the pan on a first track. Also, a slider can be assigned to control the volume on a second track. Various functions within the DAW can be assigned to a MIDI controller in this manner. The MIDI controller can also include a sustain pedal and/or an expression pedal. These can affect how a MIDI instrument plays MIDI data. For example, holding down a sustain pedal while recording MIDI data can cause an elongation of the length of the sound played if a piano software instrument has been selected for that MIDI track.

As shown in FIG. 1, the system 100 can include a MIDI keyboard 104 and/or a drum pad controller 106. The MIDI keyboard 104 can generate MIDI data which can be provided to a device that generates sounds based on the received MIDI data. The drum pad MIDI controller 106 can also generate MIDI data and send this data to a capable device which generates sounds based on the received MIDI data. The MIDI keyboard 104 can include piano style keys, as shown. The drum pad MIDI controller 106 can include rubber pads. The rubber pads can be touch and pressure sensitive. Upon hitting or pressing a rubber pad, or pressing a key, the MIDI controller (104,106) generates and sends MIDI data to the computer 102.

An instrument capable of generating electronic audio signals can be coupled to the computer 102. For example, as shown in FIG. 1, an electrical output of an electric guitar 108 can be coupled to an audio input on the computer 102. Similarly, an acoustic guitar 108 equipped with an electrical output can be coupled to an audio input on the computer 102. In another example, if an acoustic guitar 108 does not have an electrical output, a microphone positioned near the guitar 108 can provide an electrical output that can be coupled with an audio input on the computer 102. The output of the guitar 108 can be coupled to a pre-amplifier (not shown) with the pre-amplifier being coupled to the computer 102. The pre-amplifier can boost the electronic signal output of the guitar 108 to acceptable operating levels for the audio input of computer 102. If the DAW is in a record mode, a user can play the guitar 108 to generate an audio file. Popular effects such as chorus, reverb, and distortion can be applied to this audio file when recording and playing.

The external MIDI device 110 can be coupled to the computer 102. The external MIDI device 110 can include a processor, e.g., a processor which can be external to the processor 102. The external processor can receive MIDI data from an external MIDI track of a musical arrangement to generate corresponding sounds. A user can utilize such an external MIDI device 110 to expand the quality and/or quantity of available software instruments. For example, a user can configure the external MIDI device 110 to generate electric piano sounds in response to received MIDI data from a corresponding external MIDI track in a musical arrangement from the computer 102.

The computer 102 and/or the external MIDI device 110 can be coupled to one or more sound output devices (e.g., monitors or speakers). For example, as shown in FIG. 1, the computer 102 and the external MIDI device 110 can be coupled to a left monitor 112 and a right monitor 114. In one or more embodiments, an intermediate audio mixer (not shown) can be coupled between the computer 102, or external MIDI device 110, and the sound output devices, e.g., the monitors 112, 114. The intermediate audio mixer can allow a user to adjust the volume of the signals sent to the one or more sound output devices for sound balance control. In other embodiments, one or more devices capable of generating an audio signal can be coupled to the sound output devices 112, 114. For example, a user can couple the output from the guitar 108 to the sound output devices.

The one or more sound output devices can generate sounds corresponding to the one or more audio signals sent to them. The audio signals can be sent to the monitors 112, 114 which can require the use of an amplifier to adjust the audio signals to acceptable levels for sound generation by the monitors 112, 114. The amplifier in this example can be internal or external to the monitors 112, 114.

Although, in this example, a sound card can internal to the computer 102, many circumstances exist where a user can utilize an external sound card (not shown) for sending and receiving audio data to the computer 102. A user can use an external sound card in this manner to expand the number of available inputs and outputs. For example, if a user wishes to record a band live, an external sound card can provide eight (8) or more separate inputs, so that each instrument and vocal can each be recorded onto a separate track in real time. Also, disc jockeys (djs) may wish to utilize an external sound card for multiple outputs so that the dj can cross-fade to different outputs during a performance.

Figure 2:
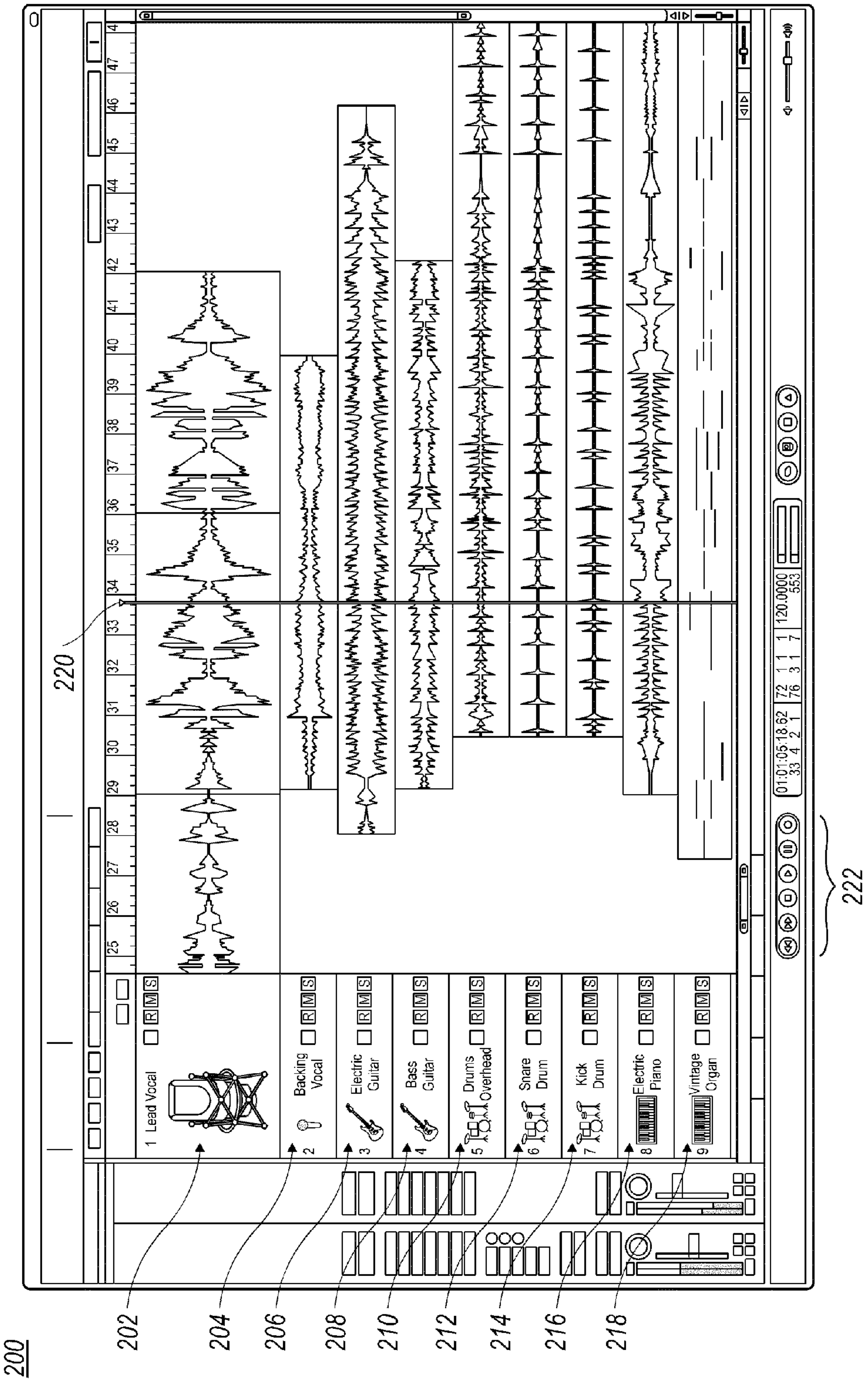
FIG. 2 depicts a screenshot of a GUI of a DAW displaying a musical arrangement including MIDI and audio tracks in accordance with an exemplary embodiment.

Referring to FIG. 2, a screenshot of a musical arrangement in a GUI of a DAW in accordance with an exemplary embodiment is illustrated. The musical arrangement 200 can include one or more tracks with each track having one or more of audio files or MIDI files. Generally, each track can hold audio or MIDI files corresponding to each individual desired instrument. As shown, the tracks can be positioned horizontally. A playhead 220 moves from left to right as the musical arrangement is recorded or played. As one of ordinary skill in the art would appreciate, other tracks and playhead 220 can be displayed and/or moved in different manners. The playhead 220 moves along a timeline that shows the position of the playhead within the musical arrangement. The timeline indicates bars, which can be in beat increments. For example as shown, a four (4) beat increment in a 4/4 time signature can be displayed on a timeline with the playhead 220 positioned between the thirty-third (33rd) and thirty-fourth (34th) bar of this musical arrangement. A transport bar 222 can be displayed and can include commands for playing, stopping, pausing, rewinding and fast-forwarding the displayed musical arrangement. For example, radio buttons can be used for each command. If a user were to select the play button on transport bar 222, the playhead 220 would begin to move down the timeline, e.g., in a left to right fashion.

As shown, the lead vocal track, 202, can an audio track. One or more audio files corresponding to a lead vocal part of the musical arrangement can be located on this track. In this example, a user has directly recorded audio into the DAW on the lead vocal track. The backing vocal track, 204 can also be an audio track. The backing vocal 204 can contain one or more audio files having backing vocals in this musical arrangement. The electric guitar track 206 can contain one or more electric guitar audio files. The bass guitar track 208 can contain one or more bass guitar audio files within the musical arrangement. The drum kit overhead track 210, snare track 212, and kick track 214 relate to a drum kit recording. An overhead microphone can record the cymbals, hit-hat, cow bell, and any other equipment of the drum kit on the drum kit overhead track. The snare track 212 can contain one or more audio files of recorded snare hits for the musical arrangement. Similarly, the kick track 214, can contain one or more audio files of recorded bass kick hits for the musical arrangement. The electric piano track 216 can contain one or more audio files of a recorded electric piano for the musical arrangement.

The vintage organ track 218 can be a MIDI track. Those of ordinary skill in the art will appreciate that the contents of the files in the vintage organ track 218 can be shown differently because the track contains MIDI data and not audio data. In this example, the user has selected an internal software instrument, a vintage organ, to output sounds corresponding to the MIDI data contained within this track 218. A user can change the software instrument, for example to a trumpet, without changing any of the MIDI data in track 218. Upon playing the musical arrangement the trumpet sounds would now be played corresponding to the MIDI data of track 218. Also, a user can set up track 218 to send its MIDI data to an external MIDI instrument, as described above.

Each of the displayed audio and MIDI files in the musical arrangement as shown on screen 200 can be altered using the GUI. For example, a user can cut, copy, paste, or move an audio file or MIDI file on a track so that it plays at a different position in the musical arrangement. Additionally, a user can loop an audio file or MIDI file so that it can be repeated, split an audio file or MIDI file at a given position, and/or individually time stretch an audio file.

Figure 3:
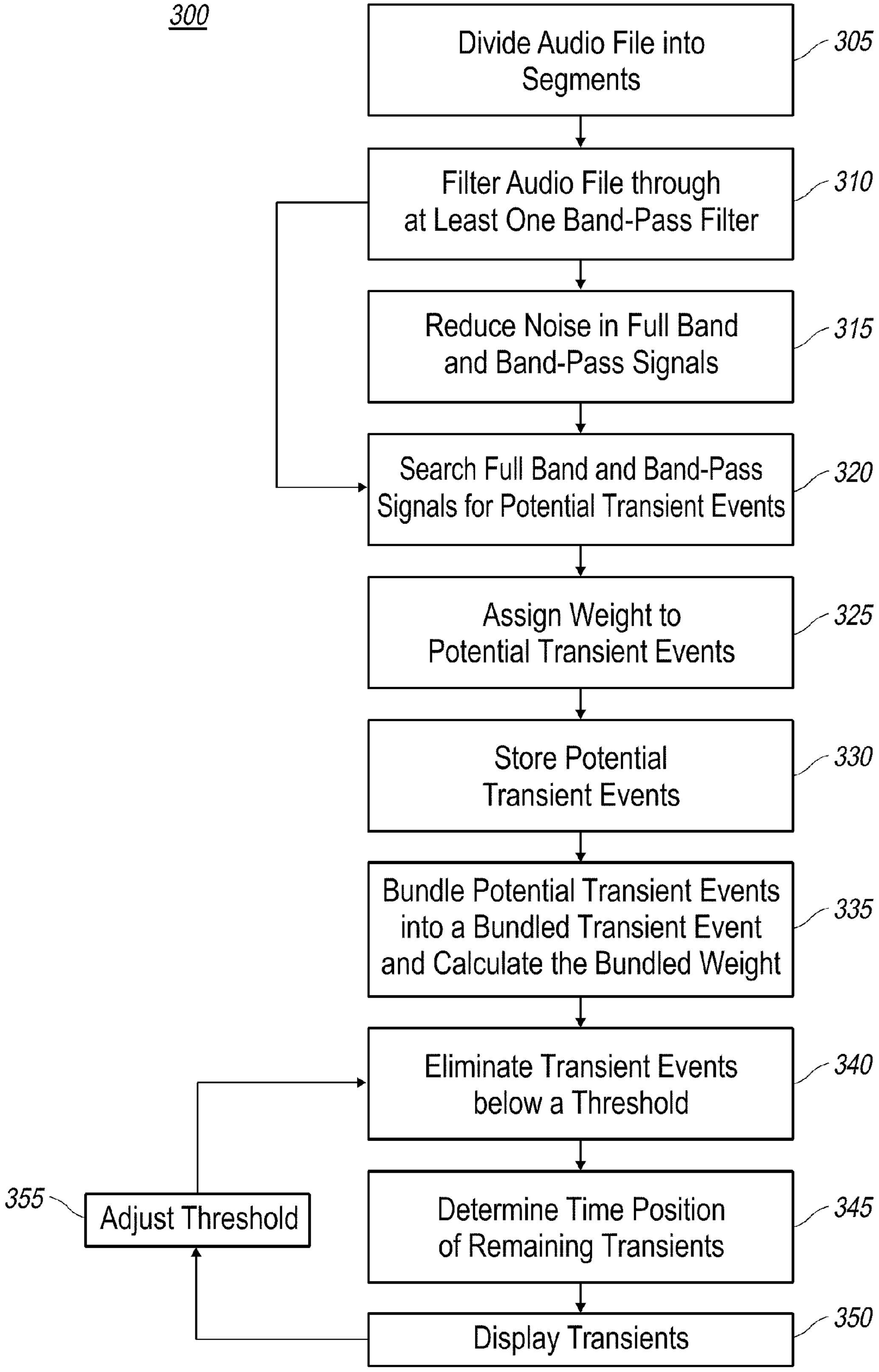
FIG. 3 is a flow chart of a method for detecting transients in accordance with an exemplary embodiment.

Referring to FIG. 3, a flow chart of a method for detecting transients in an audio file in accordance with an exemplary embodiment is illustrated. The exemplary method 300 is provided by way of example, as there are a variety of ways to carry out the method. In one or more embodiments, the method 300 is performed by the computer 102 of FIG. 1. The method 300 can be executed or otherwise performed by one or a combination of various systems. The method 300 described below can be carried out using the devices illustrated in FIG. 1 by way of example, and various elements of this figure are referenced in explaining exemplary method 300. Each block shown in FIG. 3 represents one or more processes, methods or subroutines carried out in exemplary method 300. The exemplary method 300 can begin at block 305.

At block 305, the audio file can be divided into segments. For example, the processor or processing module of computer 102, e.g., can divide the audio file into segments using a ringbuffer. The ringbuffer can hold a portion of the file while the processor or processor module analyzes that portion of the file. The ringbuffer can hold any time portion of the file, for instance, the ringbuffer can hold a 40 ms portion of the file, corresponding to 40 ms of audio. Once the processor or processing module finishes analyzing one portion of the file, the ringbuffer can be moved to another portion of the file for analysis by the processor or processing module.

Figure 4:
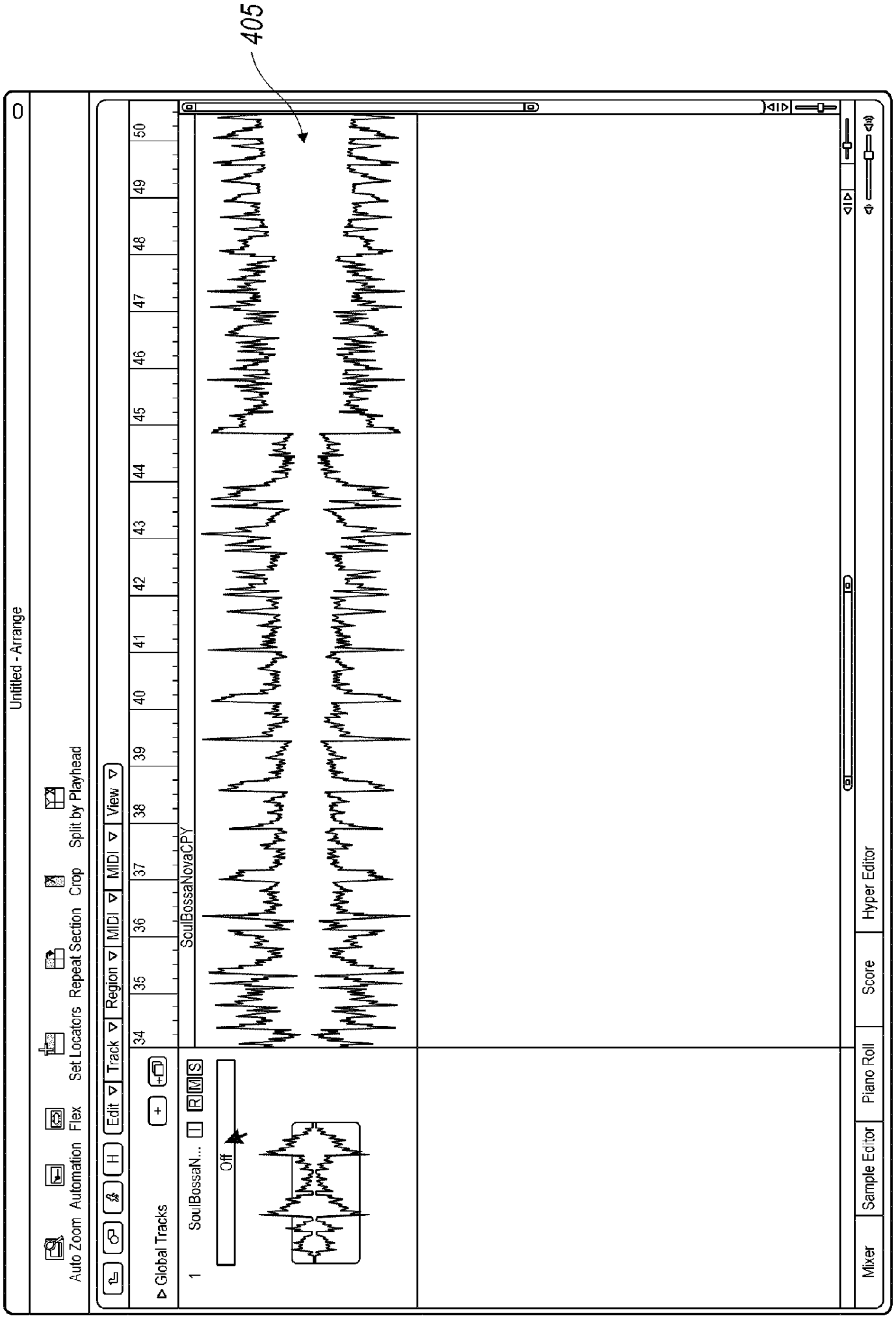
FIG. 4 depicts a screenshot of a GUI of a DAW displaying an audio track in accordance with an exemplary embodiment.

FIG. 4 is a screenshot 400 of a GUI displaying a portion of a global track of an audio file 405. While only the global track is shown, any number of tracks can be displayed simultaneously as is shown in FIG. 2. In order to determine where the transients are in audio file 405, the file must be assessed using at least one of the methods described herein. Each audio file includes a full band signal. A full band signal can be between any two wavelengths, for example, the full band signal can be between 20 Hz and 20 kHz.

Returning to FIG. 3, at block 310, the audio file can be filtered into at least one band-pass filtered signal. For example, the processor or processing module of computer 102 can divide the full band signal into one or more band-pass filtered signals by passing the full band signal through band-pass filters. The band-pass filters can be computer based filters or any other device capable of filtering out unwanted bandwidth. Each band-pass filtered signal can be of any portion of the electromagnetic spectrum, for example, each band-pass filtered signal can be in 10 Hz increments, 100 Hz increments, or 500 Hz increments or each band-pass filtered signal can have a center frequency between 300 Hz and 6000 Hz. Additionally, there can be any number of band-pass filtered signals.

At block 315, the noise level in the full band and band-pass signals is reduced. For example, the processor or processing module can filter out background noise by eliminating portions of the amplitudes of the signals that are below a threshold value. The signals can then be smoothed using an envelope follower. For example, the envelope follower can use an attack time of 0 ms, thereby leaving any positive amplitude changes, and a release time between 50 ms and 300 ms. The release time can be chosen depending on the part of the audio spectrum that is to be analyzed.

At block 320, potential transient events in the full band signal and each of the band-pass signals are detected. For example, the processor or processing module can analyze each segment of the signals for potential transient events. The signals can be analyzed concurrently or in succession. The detection process can include the processor or processing module determining if the minimum amplitude of each segment of each signal occurs earlier in the segment than the maximum amplitude of the signal, then a positive amplitude change has been detected and the event is a possible transient. If the maximum amplitude of each segment of each signal occurs earlier in the segment than the minimum amplitude of the signal, then a negative amplitude change has been detected and, thus, the event is not a transient event and is eliminated.

At block 325, a weight value can be assigned to the detected transients in both the full band signal and the band-pass signals. For example, the processor can assign a weight value to each transient. The weight of each transient can be related to the energy change in the signal when the event is detected and can be derived from the minimum and maximum amplitude of each potential transient event. Due to this method of weighting transients, a small energy change in a relatively quieter passage can be more noticeable than the same small energy change in a louder passage.

At block 330, the weighted transients can be stored. For example, the weighted transients can be put in a list which can be sorted by the transients' time positions. For instance the list can be stored in the memory elements of computer 102 or in external memory elements. Each transient can be stored with the following data: (1) time position, (2) weight calculated from the amplitude maximum and the amplitude minimum that originally lead to the detection of the event, (3) visual weight (a threshold value that determines if the transient will be visible to the user and the DAW), and (4) the center frequency of the frequency band in which the detection took place or zero in the case of the full band.

At block 335, the transient events can be bundled and reweighted by consolidating transient events that appear in close time proximity into a bundled transient event and calculating the bundled weight. For instance the processor or processing module can bundle all events that occur within a predetermined time period, which can be based on the size of the ringbuffer. The time position of the first event can be used as an anchor position. Upcoming events in the sorted list within the predetermined time period can be candidates for bundling. Each event's attribute frequency can include the origin of the detection and whether the event was detected in the full band or in one of the pass-band signals.

The anchor can be adjusted if the next candidate is from the full band signal. The predetermined time period would then restart and all of the following candidates will be from pass-band filters because an event from the same frequency band can only occur once within the predetermined time period based on the size of the ringbuffer.

Varying amplitudes within the spectrum and/or a gradual decay in the full band can lead to false detections in the pass-band detectors. However, these false detections occur sporadically over different bands. Thus, a naturally decaying sound can result in falsely detected events from several band-pass filters. However, the time positions of these false events will not be close enough in time to be interpreted as transient events. Transient events have contributions from several bands at substantially the same time position. As a result, the DAW can reduce the number of falsely detected transients compared to conventional approaches.

Therefore, pass-band contributions that do not occur at substantially the same time position can be ignored. If a pass-band candidate for a bundled transient event is more than a predetermined time period away from the next neighboring pass-band time position, then the processor can disregard the neighboring pass-band candidate and the bundling process can be aborted before the full section is evaluated because the processor assumes that the remaining candidates within the section are not related to the same transient. The predetermined time period can be any period, for example 2 ms.

Detecting a transient in the full band signal can have a higher significance over detecting an event in a pass-band signal. However, pass-band results can be relevant because events can be found in the pass-bands only. Additionally, the more detections there are in the pass-bands the more significant the resulting transient will be. Therefore, in calculating the total weight of each bundled transient, a higher weight can be given to a full band event than a pass-band event. However, any weighting scheme can be implemented. For example, a 30% weight value can be given to a full band event while the remaining 70% can be divided among the pass-bands. Thus in the example where there are 16 pass-bands, each pass-band receives a 4.375% (70/16%) weight value. However, if an event does not register in the full band, then 0% weight is given to the full band and the pass-bands each receive an equal weight. Thus, in the example where there are 16 pass-bands, each pass-band receives a 6.25% (100/16%) weight value.

Thus, as a first example, if a bundle contains one event from the full band, an event from pass-band filter 1, and an event from pass-band filter 2, the final weight will be calculated from 30% of the full band's weight plus 4.375% of pass-band filter 1's weight plus 4.375% of pass-band filter 2's weight. On the other hand, as a second example, if a bundle contains one event from pass-band 1, one event from pass-band 4, and one event from pass-band 8, the final weight will be calculated from 6.25% of pass-band filter 1's weight plus 6.25% of pass-band filter 4's weight plus 6.25% of pass-band filter 8's weight.

The bundled weights can be normalized and discredited to a useful value range. For instance, the range can be 1 to 100 with 100 entries. A weight based histogram can be calculated, e.g., a table can be generated containing how often each discredited weight appears in the whole list.

Based on the histogram, a weight gravity can be calculated. A higher weight gravity indicates that the audio material has significant strong repetitive energy changes and that the material can be described as being percussive. A lower weight gravity, on the other hand, indicates that the weights are more spread across the possible weight range or that generally more transients show a lower weight. Therefore, the audio material has less prominent transients and can be described as non-percussive.

In percussive materials, it can be assumed that every single transient in the file has a rhythmically high significance. Therefore, all of the transients should be visible to the user and the DAW for any time stretch algorithm. The attribute of visibility weight then can be set to the minimum for each transient in the list.

In non-percussive materials, it can be assumed that only a subset of the transients will be initially visible. Only transients with a low weight will remain invisible. This is the optimal case for most instrument tracks. The visibility weight can also be taken into account in determining the final weight value of each bundled transients.

Returning to FIG. 3, at block 340, the weighted transients that are below a threshold value are eliminated. For example, the processor or processing module can have a preset threshold value or a user can input a threshold value via commands from the I/O device of computer 102. Additionally, a user can adjust the threshold value via commands from the I/O device.

At block 345, the time position of each remaining transient can be determined. For example, the processor or processing module can define the time position of each bundled transient by one of two methods. If there is a full band event within the bundle, the time position of the full band event can be used. If there is no full band event within the bundle, the time position of the first occurring band pass participant can be used.

Figure 5:
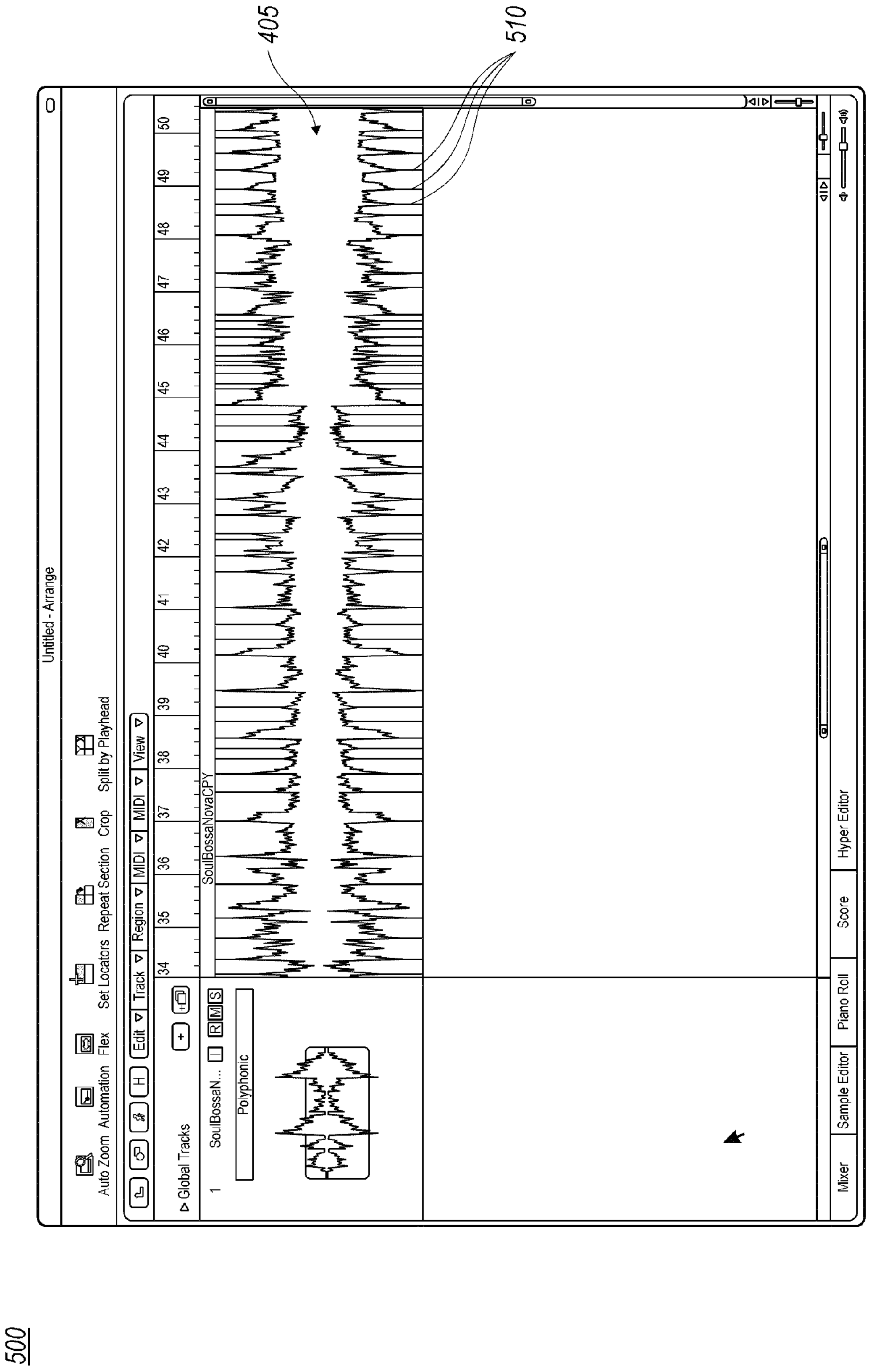
FIG. 5 depicts a screenshot of a GUI of a DAW displaying the audio track with the locations of the transients shown in accordance with an exemplary embodiment.

At block 350, a representation of each remaining transient can be displayed. For example, the processor or display module can display, on the I/O device, a representation of each transient, e.g., a line, on the original audio file. The display can be on a screen or as a computer printout. FIG. 5 is a screenshot 500 of the audio file 405, from FIG. 4, additionally showing the location of each transient (exemplary transients are labeled as 510) above a predetermined threshold.

At block 355, the threshold level can be adjusted. As the threshold value is adjusted, representations of more or less transients can be displayed. For example, a user can modify or adjust the transients within at least a portion of the audio file using plus and minus buttons displayed on the GUI via commands from the I/O device and method 300 would proceed to block 340. In the event a user adjusts the threshold level, the processor or processing module can retrieve the stored weighted transients and re-evaluate which transients are above the new threshold level. The processor or processing module can then display on the I/O device a representation of each transient that is above the new threshold level.

Figure 6:
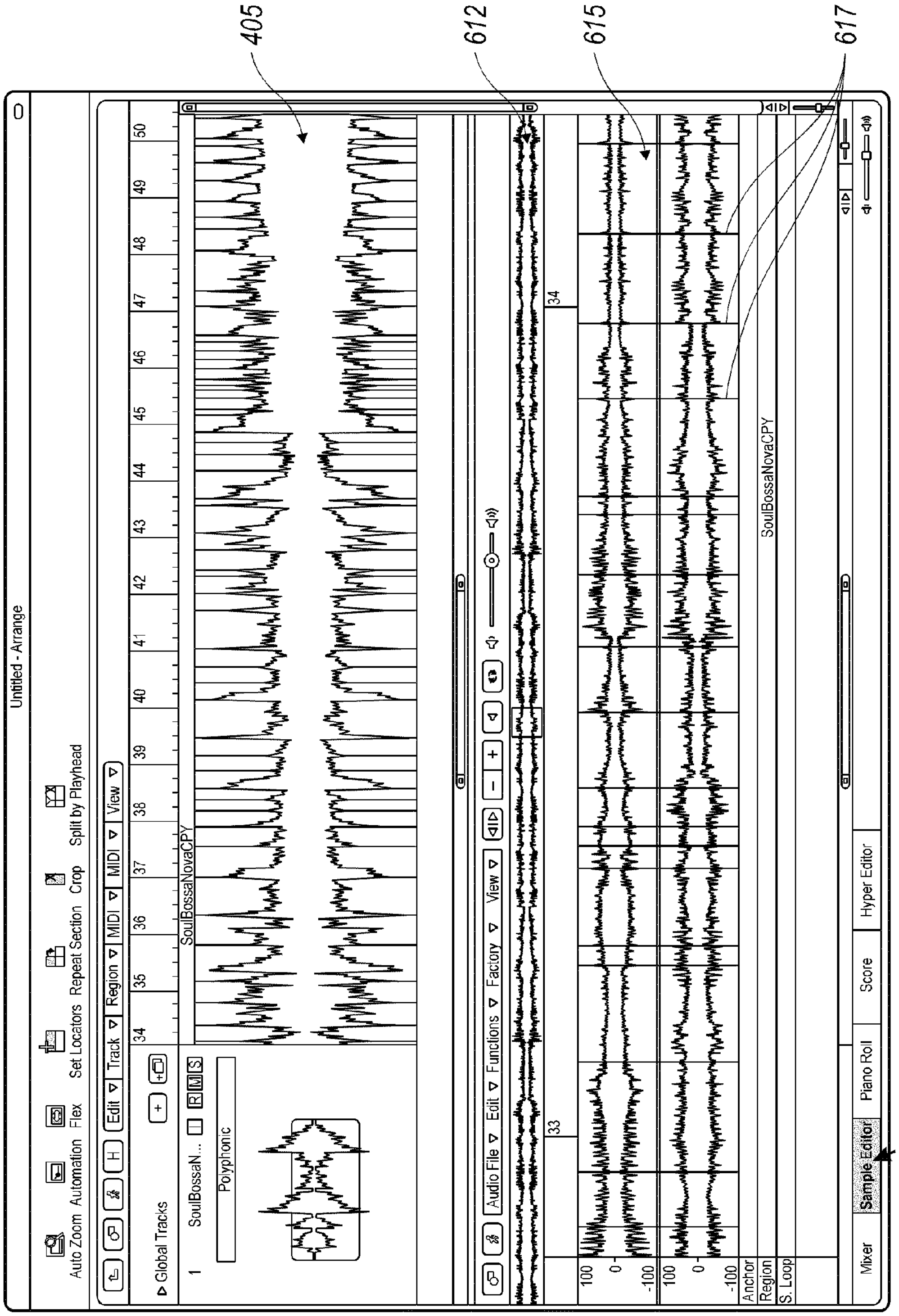
FIG. 6 depicts a screenshot of a GUI of a DAW displaying an enlarged portion of the audio track in accordance with an exemplary embodiment.
Figure 7:
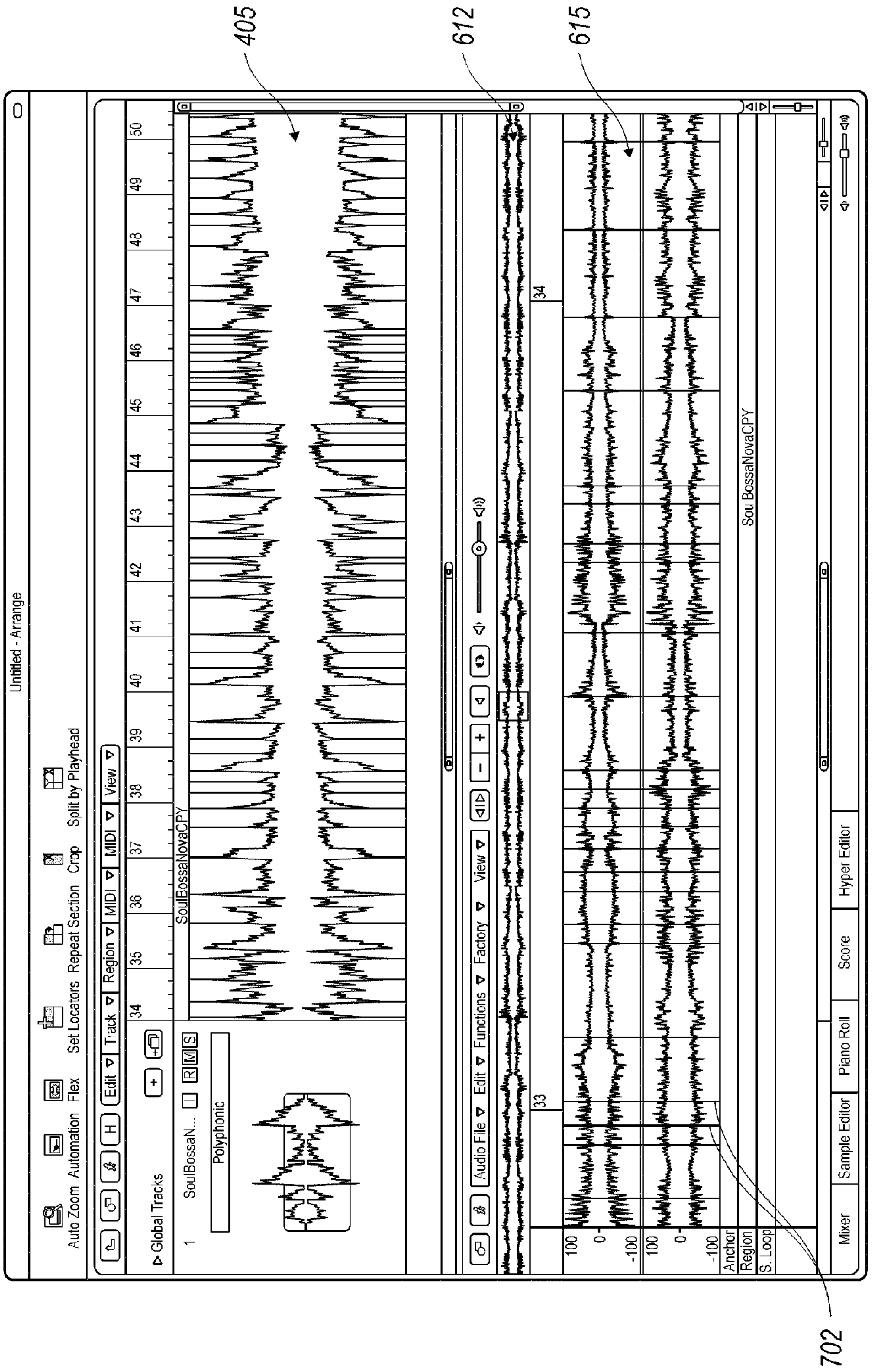
FIG. 7 depicts a screenshot of a GUI of a DAW displaying an increase in the number of transients in the entire audio track in accordance with an exemplary embodiment.
Figure 8:
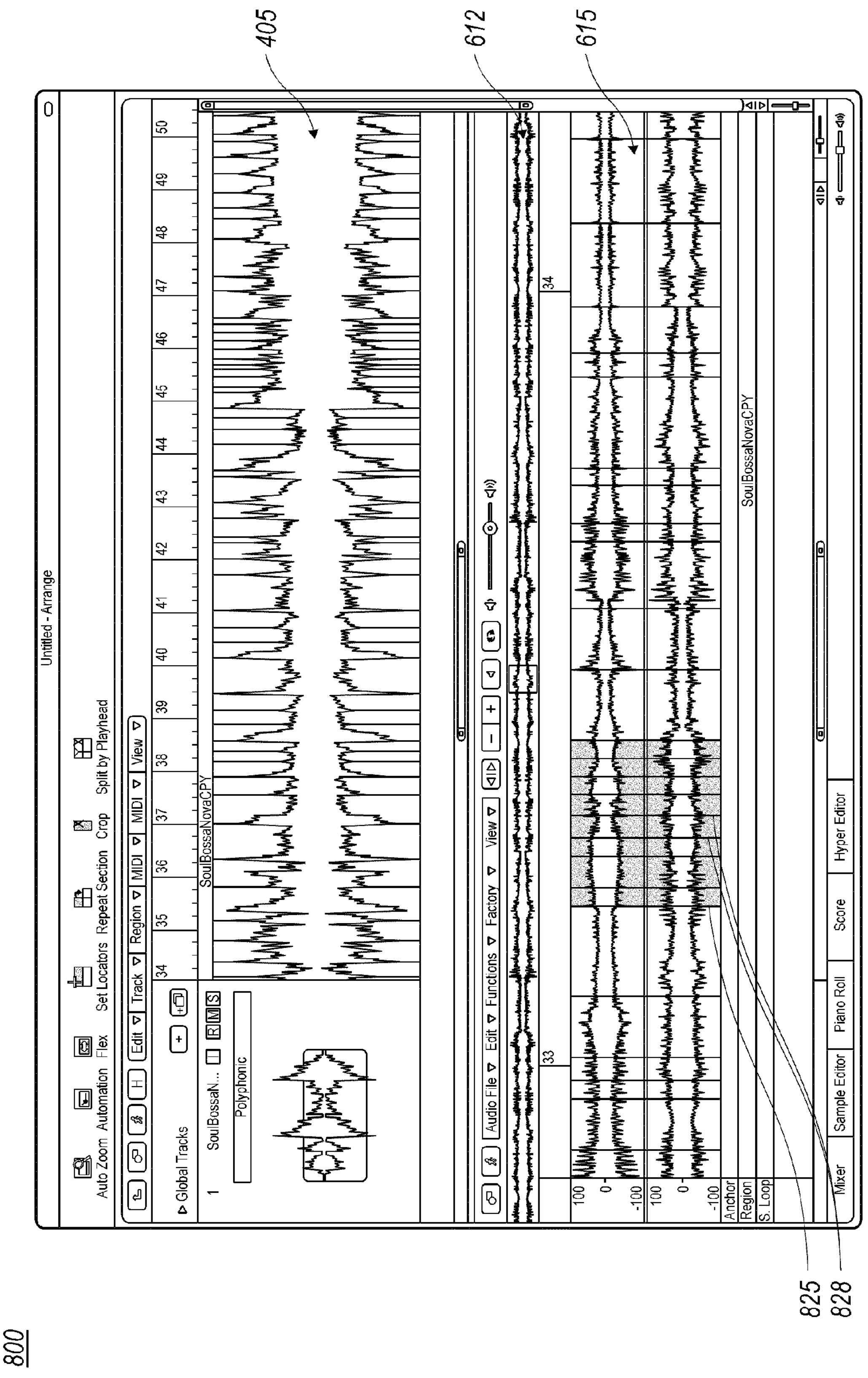
FIG. 8 depicts a screenshot of a GUI of a DAW displaying an increase in the number of transients in a selected portion of the audio track in accordance with an exemplary embodiment.

FIG. 6 is a screenshot 600 of audio file 405, from FIG. 4, including the entire audio file 612, and an enlarged portion 615 of audio file 405. In the enlarged portion 615, the transients are also shown (exemplary transients are labeled as 617). FIG. 7 is a screenshot 700 of audio file 405 including enlarged portion 615, in which the number of transients in the entire audio file 612 (exemplary new transients are labeled as 702) was increased by lowering the threshold value. FIG. 8 is a screenshot 800 of audio file 405, from FIG. 4, including the entire audio file 612, and an enlarged portion 615 of audio file 405, from FIG. 6. Additionally, FIG. 8 shows a selected portion of entire audio file 612 in selected area 825. A user can increase the number of transients in one portion of the audio file while reducing the number of transients in a second portion of the audio file via commands from the I/O device of computer 102, e.g. As known in the art, a user can select a portion of an audio file by using an input device, e.g. a mouse, and clicking and dragging over a portion of the audio file. After selecting the portion of the audio file, the user can increase or decrease the threshold value. This can be accomplished using a plus radio button and a minus radio button. As a result of the threshold change, the number of transients can increase or decrease. FIG. 8 also shows new transients 828 that are displayed after the threshold value within selected area 825 was decreased.

Figure 9:
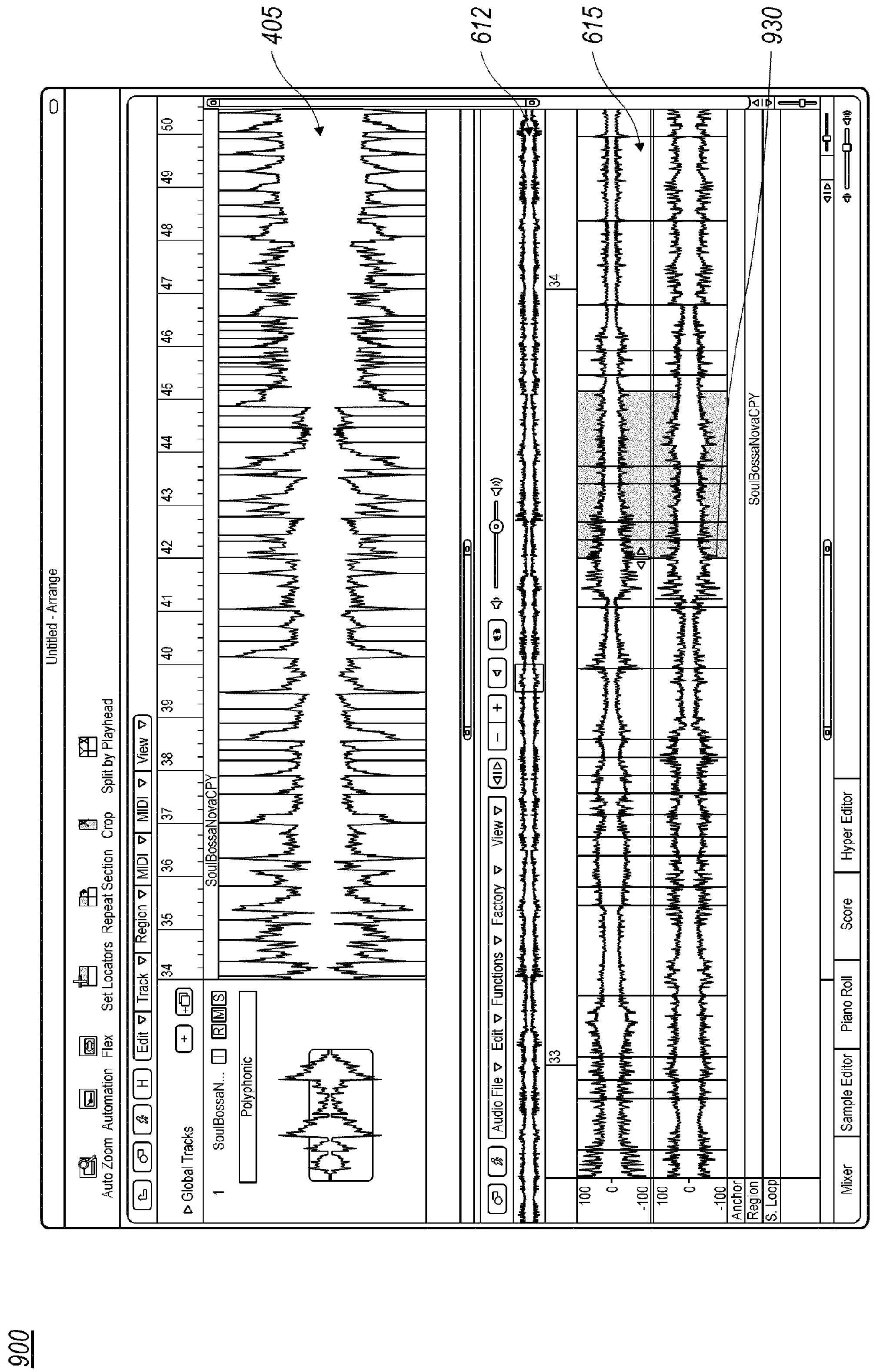
FIG. 9 depicts a screenshot of a GUI of a DAW displaying a transient that has been moved in the enlarged portion of the audio track in accordance with an exemplary embodiment.

A user can also adjust the location of one or more transients that are displayed using methods known in the art. FIG. 9 is a screenshot 900 of audio file 405 including enlarged portion 615, in which transient 930 has been moved.

As known in the art, detected transients can be stored. For example, transients can be stored with the following data: (1) time position, (2) weight calculated from the amplitude maximum and the amplitude minimum that originally lead to the detection of the event, (3) visual weight (a threshold value that determines if the transient will be visible to the user and the audio engine), and (4) the center frequency of the frequency band in which the detection took place or zero in the case of the full band.

Although the above description illustrates transient detection in a single audio file of a musical arrangement, the DAW can utilize this transient detection process for multiple audio files of a musical arrangement.

The technology can take the form of an entirely hardware embodiment, an entirely software embodiment or an embodiment containing both hardware and software elements. In one embodiment, the invention can implemented in software, which includes but can not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers can not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized and/or distributed as known to those skilled in the art.

The above disclosure provides examples and aspects relating to various embodiments within the scope of claims, appended hereto or later added in accordance with applicable law. However, these examples are not limiting as to how any disclosed aspect may be implemented, as those of ordinary skill can apply these disclosures to particular situations in a variety of ways.

We claim:

1. A method to detect time-based transients in an audio file having a full band signal, the method comprising, in a processor:

dividing the full band signal into segments;

filtering the full band signal in a given segment into at least one band-pass filtered signal;

detecting transients of the full band signal in the given segment;

detecting transients of the at least one band-pass filtered signal in the given segment;

assigning a weight value to the detected transients of the full band signal for the given segment, wherein the weight value of the detected transients of the full band signal is based on a difference between a minimum and maximum amplitude of the full band signal in the given segment;

assigning a weight value to the detected transients of the at least one band-pass filtered signal for the given segment, wherein the weight value of the detected transients of the at least one band-pass filtered signal is based on a difference between a minimum and maximum amplitude of the at least one band-pass filtered signal in the given segment; and eliminating weighted transients that are below a predetermined threshold in the given segment.

2. The method of claim 1, wherein the segments are predetermined time increments.

3. The method of claim 2, wherein the predetermined time increments are 40 ms increments.

4. The method of claim 1, further comprising the processor:

consolidating transients that occur within a first predetermined time period into a bundled transient event;

calculating a total weight value for each bundled transient event based on the weight value of the transients of the full band signal and the weight value of the transients of the at least one band-pass filtered signal; and determining a final time position of the bundled transient event.

5. The method of claim 4, wherein the first predetermined time period is 40 ms.

6. The method of claim 4, further comprising the processor excluding a transient detected in a second band-pass filtered signal from the bundled transient event that does not occur within a second predetermined time period from a transient detected in a first band-pass filtered signal.

7. The method of claim 6, wherein the second predetermined time period is 2 ms.

8. The method of claim 1, wherein the weight value assigned to the detected transients of the full band signal is higher than the weight value assigned to the detected transients of the at least one band-pass filtered signal.

9. The method of claim 8, wherein there are a plurality of band-pass filtered signals and all band-pass filtered signals are assigned the same weight value and a sum of the weight values of each band-pass filtered signal times a measured weight in that signal is equal to a final weight of a transient event.

10. The method of claim 1, further comprising the processor:

normalizing a list of remaining transients;

classifying each transient in the list of normalized transients as percussive or non-percussive from a weight histogram based on the list of normalized transients;

determining a visibility weight of each transient based on the classification of each transient; and calculating a total weight value for each transient based on the weight value of the transients of the full band signal, the weight value of the transients of the at least one band-pass filtered signal, and the visibility weight.

11. The method of claim 1, further comprising the processor adjusting the predetermined threshold in response to receiving a command.

12. The method of claim 11, wherein the threshold is adjusted for a portion of the audio file.

13. A system, comprising:

a display device;

an input device for navigating the display; and a processor coupled to the display and the input device, the processor configured to detect time-based transients in an audio file having a full band signal, and the processor further adapted to:

divide the full band signal into segments;

filter the full band signal in each segment into at least one band-pass filtered signal;

detect transients of the full band signal in a given segment;

detect transients of the at least one band-pass filtered signal in the given segment;

assign a weight value to the detected transients of the full band signal for the given segment, wherein the weight value of the detected transients of the full band signal is based on a difference between a minimum and maximum amplitude of the full band signal in the given segment;

assign a weight value to the detected transients of the at least one band-pass filtered signal for the given segment, wherein the weight value of the detected transients of the at least one band-pass filtered signal is based on a difference between a minimum and maximum amplitude of the at least one band-pass filtered signal in the given segment; and eliminate weighted transients that are below a predetermined threshold in the given segment.

14. The system of claim 13, wherein the segments are predetermined time increments.

15. The system of claim 14, wherein the predetermined time increments are 40 ms increments.

16. The system of claim 13, wherein the processor is further adapted to:

consolidate transients that occur within a first predetermined time period into a bundled transient event;

calculate a total weight value for each bundled transient event based on the weight value of the transients of the full band signal and the weight value of the transients of the at least one band-pass filtered signal; and determine a final timing position of the bundled transient event.

17. The system of claim 16, wherein the first predetermined time period is 40 ms.

18. The system of claim 16, wherein the processor is further adapted to exclude a transient detected in a second band-pass filtered signal from the bundled transient event that does not occur within a second predetermined time period from a transient detected in a first band-pass filtered signal.

19. The system of claim 18, wherein the second predetermined time period is 2 ms.

20. The system of claim 13, wherein the weight value assigned to the detected transients of the full band signal is higher than the weight value assigned to the detected transients of the at least one band-pass filtered signal.

21. The system of claim 20, wherein there are a plurality of band-pass filtered signals and all band-pass filtered signals are assigned the same weight value and a sum of the weight value of each band-pass filtered signal times a measured weight in that signal is equal to a final weight of the transient event.

22. The system of claim 13, wherein the processor is further adapted to:

normalize a list of remaining transients;

classify each transient in the list of normalized transients as percussive or non-percussive from a weight histogram based on the list of normalized transients;

determine a visibility weight to each transient based on the classification of each transient; and calculate a total weight value for each transient based on the weight value of the transients of the full band signal, the weight value of the transients of the at least one band-pass filtered signal, and the visibility weight.

23. The system of claim 13, wherein the processor is further adapted to adjust the predetermined threshold.

24. The system of claim 23, wherein the threshold is adjusted for a portion of the audio file.

25. A computer program product comprising:

a non-transitory computer-readable medium;

a processing module residing on the computer-readable medium and operative to detect time-based transients in an audio file having a full band signal, the processing module further operative to:

divide the full band signal into segments;

filter the full band signal in each segment into at least one band-pass filtered signal;

detect transients of the full band signal in a given segment;

detect transients of the at least one band-pass filtered signal in the given segment;

assign a weight value to the detected transients of the full band signal for the given segment, wherein the weight value of the detected transients of the full band signal is based on a difference between a minimum and maximum amplitude of the full band signal in the given segment;

assign a weight value to the detected transients of the at least one band-pass filtered signal for the given segment, wherein the weight value of the detected transients of the at least one band-pass filtered signal is based on a difference between a minimum and maximum amplitude of the at least one band-pass filtered signal in the given segment; and eliminate weighted transients that are below a predetermined threshold in the given segment.

26. The computer program product of claim 25, wherein the segments are predetermined time increments.

27. The computer program product of claim 26, wherein the predetermined time increments are 40 ms increments.

28. The computer program product of claim 25, wherein the processing module is further operative to:

consolidate transients that occur within a first predetermined time period into a bundled transient event;

calculate a total weight value for each bundled transient event based on the weight value of the transients of the full band signal and the weight value of the transients of the at least one band-pass filtered signal; and determine a final timing position of the bundled transient event.

29. The computer program product of claim 28, wherein the first predetermined time period is 40 ms.

30. The computer program product of claim 28, wherein the processing module is further operative to exclude a transient detected in a second band-pass filtered signal from the bundled transient event that does not occur within a second predetermined time period from a transient detected in a first band-pass filtered signal.

31. The computer program product of claim 30, wherein the second predetermined time period is 2 ms.

32. The computer program product of claim 25, wherein the weight value assigned to the detected transients of the full band signal is higher than the weight value assigned to the detected transients of the at least one band-pass filtered signal.

33. The computer program product of claim 32, wherein there is a plurality of band-pass filtered signals and all band-pass filtered signals are assigned the same weight value and a sum of the weight value of each band-pass filtered signal times a measured weight in that signal is equal to a final weight of the transient event.

34. The computer program product of claim 25, wherein the processing module is further operative to:

normalize a list of remaining transients;

classify each transient in the list of normalized transients as percussive or non-percussive from a weight histogram based on the list of normalized transients;

determine a visibility weight to each transient based on the classification of each transient; and calculate a total weight value for each transient based on the weight value of the transients of the full band signal, the weight value of the transients of the at least one band-pass filtered signal, and the visibility weight.

35. The computer program product of claim 25, wherein the media further causes the processor to adjust the predetermined threshold.

36. The computer program product of claim 35, wherein the threshold is adjusted for a portion of the audio file.

37. The method of claim 1, further comprising:

determining a time position of each remaining transient in the given segment; and displaying a representation of each remaining transient at the determined time position.

38. The system of claim 13, the processor further adapted to:

determine a time position of each remaining transient in the given segment; and display a representation of each remaining transient at the determined time position.

39. The method of claim 25, the processing module further operative to:

determine a time position of each remaining transient in the given segment; and display a representation of each remaining transient at the determined time position.

* * * * *